(12) United States Patent
Lofthus et al.

(10) Patent No.: US 7,619,769 B2
(45) Date of Patent: Nov. 17, 2009

(54) PRINTING SYSTEM

(75) Inventors: Robert M. Lofthus, Webster, NY (US);
Kristine A. German, Webster, NY (US);
Dusan G. Lysy, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 797 days.

(21) Appl. No.: 11/137,634

(22) Filed: May 25, 2005

(65) Prior Publication Data

US 2006/0268318 A1   Nov. 30, 2006

(51) Int. Cl.
*G06F 15/00*   (2006.01)
*G03G 15/00*   (2006.01)

(52) U.S. Cl. ........................................ 358/1.16; 399/82

(58) Field of Classification Search ................ 358/1.16, 358/1.18, 1.15, 1.14, 1.1, 1.9, 402, 504, 450, 358/501, 3.26; 399/79, 80, 82, 87, 110, 119; 705/9, 11, 31, 50, 51; 718/102, 106; 709/201
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,095,369 A | 3/1992 | Ortiz et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,574,831 A * | 11/1996 | Grenda ........................ 358/1.4 |
| 5,596,416 A | 1/1997 | Barry et al. | |
| 5,629,762 A | 5/1997 | Mahoney et al. | |
| 5,696,893 A | 12/1997 | Fromherz et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Saeid Ebrahimi Dehkordy
(74) *Attorney, Agent, or Firm*—Fay Sharpe LLP

(57) ABSTRACT

A printing system capable of concurrently processing a plurality of job streams and including one or more marking engines and multiple print media destinations is controlled by a controller that includes a jobs scheduler for determining a schedule for processing queued print jobs using the plurality of concurrent job streams. The job scheduler determines the schedule using a method including: determining a utility function dependent at least upon user preference weighting values, a system model of capabilities of the parallel printing system, and the schedule of the queued print jobs; and optimizing the utility function respective to the schedule of queued print jobs.

31 Claims, 3 Drawing Sheets

U.S. PATENT DOCUMENTS

| | | | |
|---|---|---|---|
| 5,701,557 | A | 12/1997 | Webster et al. |
| 5,710,968 | A | 1/1998 | Clark et al. |
| 5,778,377 | A | 7/1998 | Marlin et al. |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,819,906 | B1 | 11/2004 | Herrmann et al. |
| 6,856,411 | B1 | 2/2005 | Purvis et al. |
| 7,254,355 | B2 | 8/2007 | Sahay |
| 2002/0078012 | A1 | 6/2002 | Ryan et al. |
| 2002/0097428 | A1 | 7/2002 | Ferlitsch |
| 2002/0103559 | A1 | 8/2002 | Gartstein |
| 2003/0077095 | A1 | 4/2003 | Conrow |
| 2003/0140315 | A1 * | 7/2003 | Blumberg et al. ........... 715/527 |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |

OTHER PUBLICATIONS

Desmond Fretz, "Cluster Printing Solution Announced", Today at Xerox (TAX), No. 1129, Aug. 3, 2001.
U.S. Appl. No. 11/137,251, filed May 25, 2005, Lofthus, et al.
U.S. Appl. No. 11/136,959, filed May 25, 2005, German, et al.
U.S. Appl. No. 11/137,273, filed May 25, 2005, Anderson, et. al.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Vitturo, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/120,589, filed May 3, 2005, Contino.
U.S. Appl. No. 11/102,332, filed Apr. 8, 2005, Hindi, et al.

* cited by examiner

PRINTING SYSTEM

BACKGROUND

The example embodiments relate to the printing and marking arts. They particularly relate to printing systems with multiple processing units providing substantial degrees of freedom in performing print jobs, and to print job scheduling for such printing systems. However, the following relates more generally to printing and marking systems of all types, and to print job scheduling for same.

Printing systems have generally been designed with a strong emphasis on ease of use, and a lesser emphasis on exploiting to the fullest the capabilities of the underlying printing hardware. Accordingly, the user is typically given a few pre-selected controls each having a limited number of pre-selected settings. For example, an image contrast control may have a "photo-optimized" setting, a "graphics-optimized" setting, and a "text-optimized" setting.

Additionally, printing systems have generally employed only one or a few sheet paths, and only one or a few print job destinations. For example, a typical printing system may have a single marking engine, which bottlenecks sheet processing down to a single print path. Even if multiple marking engines are provided, the print media conveyor may be configured to limit sheet processing to a single print path. In such an arrangement, the print jobs are queued and performed sequentially, in a first in-first out (FIFO) sequence.

Some more advanced printing systems provide multiple sheet paths and multiple job destinations. For example, a single job scheduler can be linked with two printing systems (tandem printing), or with three or more printing systems (cluster printing). FIFO print job queue/processing is typically employed; however, since multiple printing systems are linked to the job scheduler, the job scheduler can divide up sheets of a given job amongst two or more of the linked printing systems, so as to more efficiently process the print job. In tandem and cluster printing, each printing system is an independent printing system; accordingly, the sheets of a print job that is executed by two or more printing systems are manually collated or combined. FIFO print job queue/processing does not fully leverage the capabilities of multiple marking engines provided in tandem printing, cluster printing, and other parallel printing systems.

CROSS REFERENCE TO RELATED PATENTS AND APPLICATIONS

The following copending applications, the disclosures of which are incorporated by reference in their entireties, are mentioned:

U.S. patent application Ser. No. 11/137,251, filed contemporaneously herewith (May 25, 2005), entitled SCHEDULING SYSTEM, by Robert M. Lofthus, et al.;

U.S. patent application Ser. No. 11/136,959, filed contemporaneously herewith (May 25, 2005), entitled PRINTING SYSTEM, by Kristine A. German, et al.

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/953,953, filed Sep. 29, 2004, entitled "CUSTOMIZED SET POINT CONTROL FOR OUTPUT STABILITY (as amended)," by Charles A. Radulski et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi U.S. application Ser. No. 11/122,420, filed May 5, 2005, entitled "PRINTING SYSTEM AND SCHEDULING METHOD," by Austin L. Ricards.

REFERENCES

The following references, the disclosures of which are incorporated by reference relate generally to scheduling in a printing system:

U.S. Pat. No. 5,095,369 to Ortiz, et al. discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

U.S. Pat. No. 5,701,557 to Webster, et al. describes an image processing apparatus with a controller and plural modules and a method to define a configuration of the image processing machine.

U.S. Pat. No. 6,856,411 to Purvis, et al. discloses a scheduler for picking an itinerary in a printing machine to schedule the processing of sheets through several modules of the printing machine. The scheduler uses hard "must have" policies and soft "desired" policies to select an itinerary.

U.S. Pat. No. 5,696,893 to Fromherz, et al. describes a method for modeling a printing machine specifying a structure model with its physical and software interface and internal resource requirements, and a behavior model to describe capabilities of a component with its description of work units, transformation of work units, timed events, resource allocations, constraints and restrictions.

U.S. application Ser. No. 10/924,458 filed Aug. 23, 2004 entitled PRINT SEQUENCE SCHEDULING FOR RELIABILITY, by Robert M. Lofthus, et al. discloses a scheduler for a printing system including a plurality of printers which schedules a sequence for printing a plurality of print jobs by the printers based on minimizing printer downtime or maximizing continuous printer run time.

The following references, the disclosures of which are incorporated by reference in their entireties, relate to what have been variously called "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No. 5,489,969 to Soler, et al.; a 1991 "Xerox Disclosure Journal" publication of November-December 1991, Vol. 16, No. 6, pp. 381-383 by Paul F. Morgan; and a Xerox 8/3/01 "TAX" publication product announcement entitled "Cluster Printing Solution Announced."

BRIEF DESCRIPTION

Aspects of the present disclosure in embodiments thereof include apparatus and method embodiments. The apparatus may include a controller for controlling a printing system capable of concurrently processing a plurality of job streams and including one or more marking engines and multiple print media destinations. The controller includes a jobs scheduler determining a schedule for processing queued print jobs using the plurality of concurrent job streams. The job scheduler determines the schedule using a method including: determining a utility function dependent at least upon user preference weighting values, a system model of capabilities of the parallel printing system, and the schedule of the queued print jobs; and optimizing the utility function respective to the schedule of queued print jobs.

The apparatus may include a xerographic printing system having a plurality of interconnected processing units including one or more xerographic marking engines, the interconnected processing units defining a plurality of sheet processing paths terminating at print media destinations. A jobs scheduler schedules print jobs to a plurality of concurrent job streams using a utility function based on user selected parameters and a system model indicative of the plurality of interconnected processing units. Each job stream employs one or more of the plurality of sheet processing paths. A sheet itineraries processor causes the plurality of interconnected processing units to concurrently move sheets of the concurrent job streams along selected sheet processing paths to process the sheets and to deliver each processed sheet to a print media destination corresponding to the print job of which that sheet is a part.

The printing method may include maintaining a system model of a printing system that includes a plurality of interconnected processing units. The system model indicates characteristics of each processing unit. Received print jobs are scheduled for processing via one or more job streams by optimizing a utility function that is dependent upon user selected parameters, the job schedule, and the system model. The print jobs are processed via the one or more job streams using the plurality of interconnected processing units in accordance with the optimized jobs schedule.

DETAILED DESCRIPTION

Figure 1:
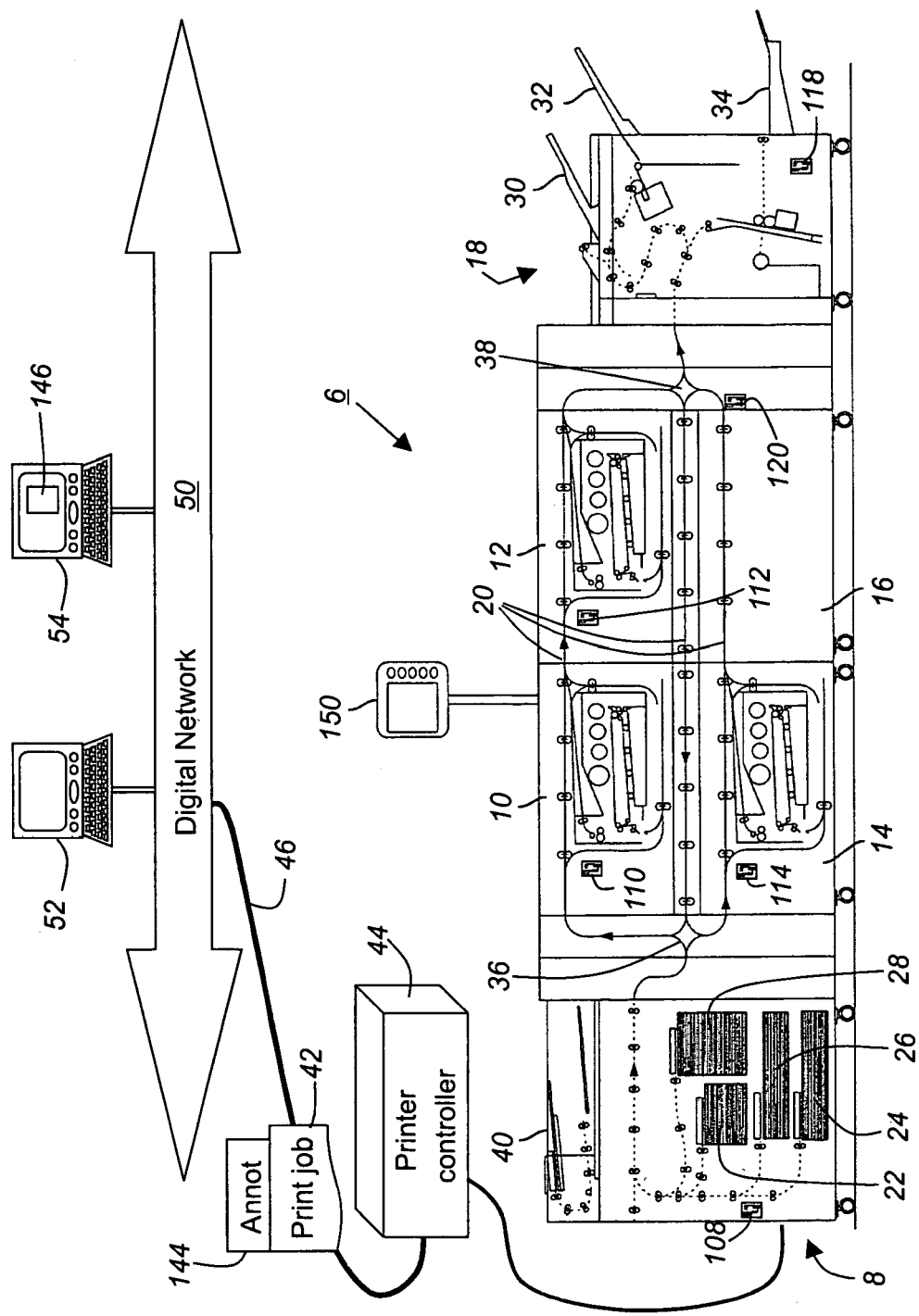
FIG. 1 diagrammatically illustrates an example printing system.

With reference to FIG. 1, an example printing system 6 is a modular printing system including processing units 8, 10, 12, 14, 16, 18 interconnected by a print media conveyer processing unit 20. While seven processing units are illustrated, the number of processing units may include one, two, three, four, five, six, seven, eight, or more processing units. In some embodiments, one or more of the processing units 8, 10, 12, 14, 16, 18, 20 are removable processing units. For example, in FIG. 1 the functional portion of the processing unit 16 is presently removed, leaving only the external housing or mounting fixture through which the print media conveyor 20 passes. In this manner, for example, the functional portion can be removed for repair, or can be replaced to effectuate an upgrade or modification of the printing system 6. The printing system 6 remains operational with the functional portion of the processing unit 16 removed, broken, or otherwise unavailable, albeit with loss of the functionality of the processing unit 16.

In the printing system 6, the presently installed processing units 10, 12, 14 are marking engines. While three marking engines 10, 12, 14 are illustrated (with the fourth marking engine 16 presently removed) the number of marking engines can be one, two, three, four, five, or more. Providing at least two marking engines typically provides enhanced features and capabilities for the printing system, since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 10, 12 may be color marking engines, while the marking engine 14 may be a black (K) marking engine.

The illustrated marking engines 10, 12, 14 employ xerographic printing technology, in which an electrostatic image is formed and coated with a toner material, and then transferred and fused to paper or another print medium by application of heat and pressure. However, marking engines employing other printing technologies can be provided as processing units, such as marking engines employing ink jet transfer, thermal impact printing, or so forth. The processing units of the printing system 6 can also be other than marking engines; for example, the processing unit 8 is a print media source processing unit that supplies paper or other print media for printing. The processing unit 18 is a finisher that provides finishing capabilities such as collation, stapling, folding, stacking, hole-punching, binding, postage stamping, or so forth.

The print media source processing unit 8 includes print media sources 22, 24, 26, 28 connected with the print media conveyor 20 to provide selected types of print media. While four print media sources are illustrated, the number of print media sources can be one, two, three, four, five, or more. Moreover, while the illustrated print media sources 22, 24, 26, 28 are embodied as components of the dedicated print media source processing unit 8, in other embodiments one or more of the marking engines may include its own dedicated print media source instead of or in addition to those of the print media source processing unit 8. Each of the print media sources 22, 24, 26, 28 can store sheets of the same type of print medium, or can store different types of print media. For example, the print media sources 24, 26 may store the same type of large-size paper sheets, print media source 22 may store company letterhead paper, and the print media source 28 may store letter-size paper. The print media can be substantially any type of medium upon which one or more of the marking engines 10, 12, 14 can print, such as: high quality bond paper, lower quality "copy" paper, overhead transparency sheets, high gloss paper, and so forth.

The print media conveyor 20 is controllable to acquire sheets of a selected print medium from the print media sources 22, 24, 26, 28, transfer each acquired sheet to one or more of the marking engine processing units 10, 12, 14 (and marking engine processing unit 16 when installed) to perform selected marking tasks, transfer each sheet to the finisher 18 to perform finishing tasks. The finisher unit 18 includes multiple print media destinations 30, 32, 34; while three destinations are illustrated, the printing system 6 may include two, three, four, or more print media destinations. That is, the multiple destinations may include two destinations, three destinations, four destinations, or more destinations. The finisher unit 18 deposits each sheet after the processing in one of the print media destinations 30, 32, 34, which may be trays, pans, or so forth.

The print media conveyor 20 passes through each intermediate processing unit 10, 12, 14, 16 to provide a bypass route by which the sheets can pass through the processing unit without interacting therewith. Branch paths are also provided in each processing unit 10, 12, 14, 16 to take the sheet off the conveyor 20 and into the functional portion of the processing unit and to deliver the processed sheet back to the conveyor 20. In the processing unit 16, the branch paths are presently removed along with the functional portion; however, the bypass portion of the conveyor 20 remains in the processing unit 16 so as to maintain continuity of the print media conveyor 20. The conveyor 20 may also include other branch junction points such as the example branch junction points 36, 38 to enable the conveyor to pass sheets along selected paths in the illustrated multiple-path conveyor configuration. This enables the illustrated arrangement in which the marking engine processing units 10, 12, 14, 16 are arranged two-dimensionally. In a linear arrangement of processing units (not illustrated), the branch junction points 36, 38 are suitably omitted.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets. The printing, finishing, paper handing, and other processing operations that can be executed by the printing system 6 are determined by the capabilities of the processing units 8, 10, 12, 14, 16, 18, 20 of the printing system 6. Those capabilities may increase over time due to addition of new processing units or upgrading of existing processing units. Those capabilities may also decrease over time due to failure or removal of one or more processing units, such as the illustrated removed functional portion of processing unit 16.

Print jobs can be supplied to the printing system 6 in various ways. A built-in optical scanner 40 can be used to scan a document such as book pages, a stack of printed pages, or so forth, to create a digital image of the scanned document that is reproduced by printing operations performed by the printing system 6. Alternatively, a print job 42 can be electronically delivered to a printing controller 44 of the printing system 6 via a wired connection 46 to a digital network 50 that interconnects example computers 52, 54 or other digital devices. For example, a network user operating word processing software running on the computer 54 may select to print the word processing document on the printing system 6, thus generating the print job 42, or an external scanner (not shown) connected to the network 50 may provide the print job in electronic form. While a wired network connection 46 is illustrated, a wireless network connection or other wireless communication pathway may be used instead or additionally to connect the printing system 6 with the digital network 50. The digital network 50 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example of a parallel printing system. In general, any number of print media sources, media handlers, marking engines, collators, finishers or other processing units can be connected together by a suitable print media conveyor configuration. While the printing system 6 illustrates a 2×2 configuration of four marking engine processing units 10, 12, 14, 16, buttressed by the media source unit 8 on one end and by the finisher unit 18 on the other end, other physical layouts can be used, such as an entirely horizontal arrangement, stacking of processing units three or more units high, or so forth. Moreover, while in the printing system 6 the marking engine processing units 10, 12, 14, 16 have removable functional portions, in some other embodiments some or all processing units may have non-removable functional portions. It will be appreciated that even if the functional portion is non-removable, the provision of the print media conveyor 20 with bypass paths through each intermediate processing unit enables the processing unit to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. While the illustrated printing system 6 includes a complex paper handler in the form of the print media conveyor 20, in other embodiments simpler paper handlers can be used. Still further, in some embodiments the parallel printing system may be a tandem or cluster of networked or otherwise logically interconnected printing systems each having its own associated print media source and finishing components. The job scheduling methods and apparatuses disclosed herein are readily applied to substantially any parallel printing system which provides for processing of multiple job streams using sheet processing paths which can concurrently process two or more sheets.

The plurality of processing units 8, 10, 12, 14, 16, 18, 20 enables the parallel printing system 6 to have a large number of capabilities and features. Each marking engine 10, 12, 14, for example, has associated low-level print settings such as xerographic voltages, fuser temperatures, toner reproduction curves, and so forth. Some of these low-level print settings are optionally modified depending upon the sequence along which a given sheet passes through the printing system 6; for example, it may be advantageous to modify the fusing temperatures of serially performed xerographic processes. At a higher functional level each marking engine has associated functional parameters such as contrast, resolution, and so forth. Similarly, tandem and cluster printing systems provide a multiplicity of capabilities by providing multiple marking engines, paper handlers, finishers, and so forth.

Figure 2:
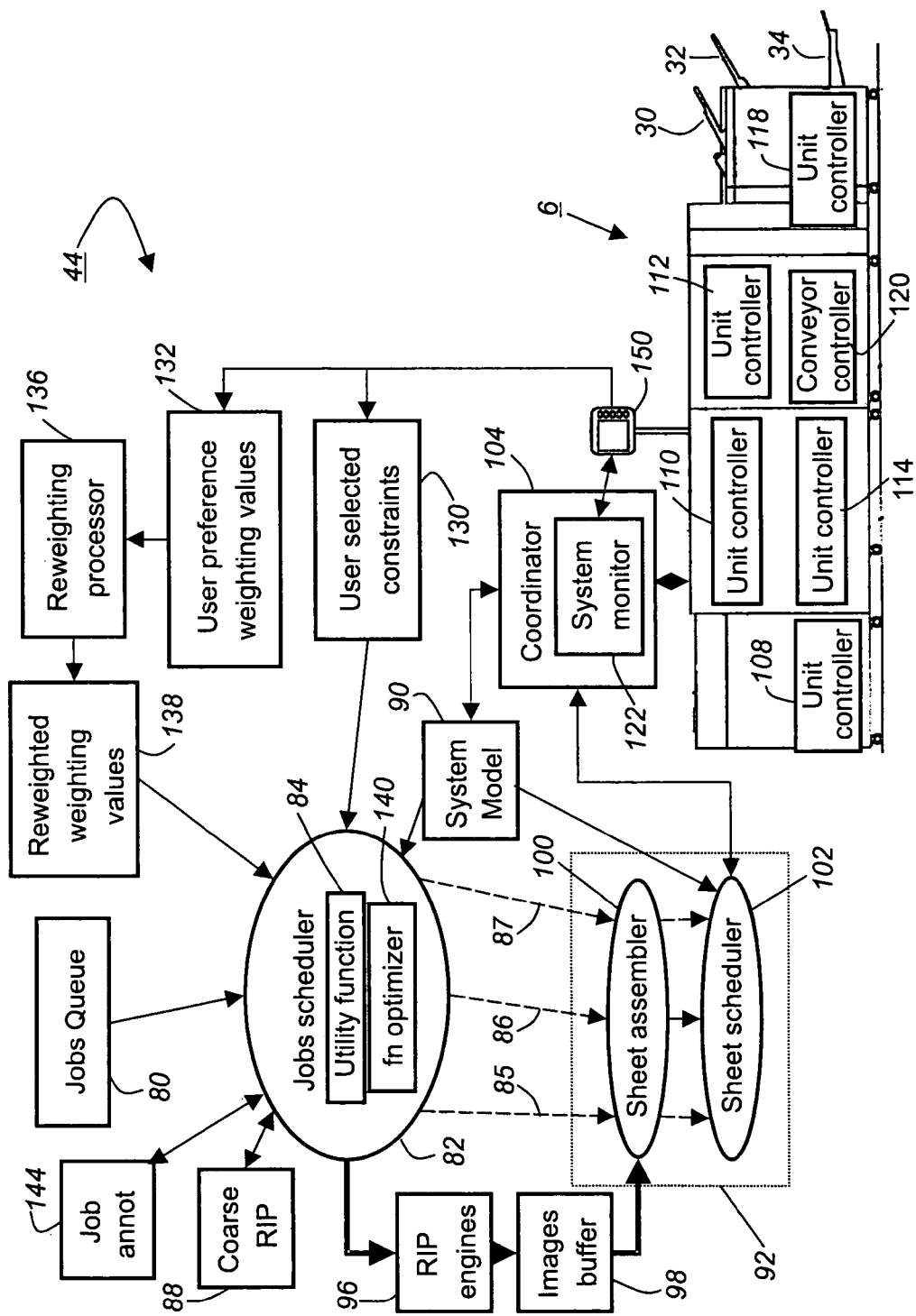
FIG. 2 diagrammatically illustrates the example printing system of FIG. 1 with system control aspects diagrammatically expanded.

With continuing reference to FIG. 1 and with further reference to FIG. 2, the printing controller 44 includes a jobs queue 80 that receives print jobs in the order they are sent to the parallel printing system 6. The number of jobs in the jobs queue 80 varies depending upon the load. At any given time, there may be zero, one, two, three, four, five, ten, fifteen, twenty, or more print jobs queued in the jobs queue 80. A jobs scheduler 82 schedules the print jobs based on a utility function 84 that takes advantage of the parallel sheet processing capabilities of the printing system 6. In order to assess properties of print jobs, a low resolution decomposition engine or coarse raster image processing (RIP) 88 or other previewer is suitably employed. The coarse RIP 88 can be used, for example, to determine the average coverage area of pages, the ratio of color to black-and-white pages or sheets, and so forth. It is to be appreciated that the low resolution decomposition 88 typically provides less than complete information about the print job. For example, it may provide statistical information about coverage for all the sheets of the job without providing the coverage of each sheet, or may provide a ratio of color images to black images without detailed information on which sheets contain color images, black images, or both color and black images, or so forth.

The printing system 6 can in general process multiple jobs concurrently or contemporaneously. Print jobs can be handled concurrently by interleaving sheets of different jobs through a single print engine. Print jobs can also be handled concurrently by parallel printing, in which different ones of the marking engines 10, 12, 14 concurrently or contemporaneously mark sheets of different print jobs. In a printing system such as the printing system 6 that has more than one marking engine, jobs can also be processed concurrently using a combination of interleaving and parallel printing. When two or more print jobs are processed concurrently, each print job is sent to one or more print media destinations designated for that print job. Preferably, all the sheets of a given print job are sent to the same print media destination, in which case fully automated collation can be performed. This is readily performed with the illustrated modular printing system 6, since the print media conveyor processing unit 20 can be controlled to deposit all sheets of a given print job in the same designated one of the print media destinations 30, 32, 34. Alternatively, the sheets of a given print job can be sent to two or more different designated destinations, and then manually collated or collected. For example, in tandem or cluster printing, it may be advantageous to use two different marking engines each having its own destination for the same print job. In this case, however, the sheets at the two destinations will need to be manually collated or combined after the print job is complete.

In FIG. 2, three concurrent or contemporaneous job streams 85, 86, 87 are processed concurrently or contemporaneously, corresponding to the three illustrated print media destinations 30, 32, 34. By having the number of concurrent or contemporaneous job streams 85, 86, 87 less than or equal to the number of print media destinations 30, 32, 34, the printing system 6 can collect the sheets of each job stream at a single corresponding print media destination. As noted previously, the printing system 6 may include two, three, four, or more print media destinations, which may be trays, pans, or so forth. Accordingly, the number of concurrent or contemporaneous job streams can be two, three, four, or more corresponding to the number of print media destinations or to some lower number of job streams. While there are efficiency advantages to having the number of job streams be less than or equal to the number of destinations, there is no pre-determined correlation between job stream and destination. For example, the job stream 85 may process a first print job that is sent to the destination 30, and then may process a second print job that is sent to the destination 34.

A first-in, first-out (FIFO) jobs processing schedule in which print jobs are processed in the order they are received may be undesirable, because the FIFO ordering may fail to take advantage of parallel printing capability. For example, it may be advantageous to alternate print jobs that put a heavy stress on the printing system 6 with print jobs that put less stress on the printing system 6. A print job that uses heavyweight paper, for example, stresses the fusers of xerographic marking engines, whereas a print job using lighter weight paper puts less stress on the xerographic fusers. If several print jobs employing heavyweight paper are received, followed by several print jobs employing lighter weight paper, the FIFO ordering disadvantageously heavily stresses the marking system 6 during the execution of the heavyweight paper print jobs.

Moreover, the optimal choice of allocation of print jobs amongst the job streams may differ depending upon what objectives the user wishes to achieve, and the degree of importance the user places on each objective. For example, one job scheduling allocation may optimize productivity but produces poor image quality consistency since it involves using several different marking engines for a single print job. Another job scheduling allocation may produce good image quality consistency by matching up each print job with a single marking engine, but may introduce sheet processing bottlenecks that reduce productivity.

Accordingly, the jobs scheduler 82 schedules the plurality of print jobs queued in the jobs queue 80 to the plurality of concurrent job streams 85, 86, 87 using the utility function 84 based on user selected parameters and a system model 90. The resulting order of jobs processing is a generally non-FIFO order, in that print jobs are generally not processed in the same order in which they were added to the jobs queue 80. For example, the jobs scheduler 82 may advantageously concurrently schedule two job streams to process print jobs that use lighter weight paper and a third job stream to concurrently process a print job that uses heavyweight paper, even though those three print jobs may have entered the jobs queue 80 in some other order.

In many instances, the allocation of print jobs to the concurrent job streams 85, 86, 87 based on the utility function 84 will schedule print jobs in a way that is different from the order in which the print jobs were added to the jobs queue 80. However, in some specific instances the scheduling using the utility function 84 based on user selected parameters and the system model 90 may coincidentally schedule print jobs in a FIFO ordering.

The concurrent job streams 85, 86, 87 are processed by a sheet itineraries processor 92, which causes the plurality of interconnected processing units 8, 10, 12, 14, 16, 18, 20 to concurrently move sheets of the concurrent job streams 85, 86, 87 along selected sheet processing paths to process the sheets and to deliver sheets of each print job to a selected one of the print media destinations 30, 32, 34 designated for that print job. Concurrent processing of the job streams 85, 86, 87 can be achieved by using different sheet processing paths for each job stream, by interleaving sheets of two or more job streams along the same sheet processing path, or by some combination of these techniques. In embodiments in which the printing system has only a single marking engine and multiple destinations, concurrent processing of the job streams is achieved by interleaving of sheets of different jobs and depositing the sheets of each print job in a designated one of the multiple destinations.

In tandem and parallel printing (not illustrated), each of the sheet processing paths terminates in different print media destination. Accordingly, in order to deliver all the sheets of a given print job to the same print media destination, each print job is suitably assigned to one of the sheet processing paths of the tandem or cluster printing system. Alternatively, if a given print job is divided amongst two or more of the sheet processing paths, manual collation will be required.

In the illustrated modular printing system 6, the print media conveyor 20 enables configurable linking of the marking engines 10, 12, 14 to define a selected sheet processing path for each sheet, with the constraint that the sheet processing paths employed for all sheets of a given print job should terminate at the same print media destination corresponding to that print job. Thus, in the illustrated embodiment the same print path, or a portion of the same print path, may be used in an interleaved fashion for sheets of different print jobs, with the finisher 18 depositing the sheets of each print job in its designated print media destination.

Once the job scheduler 82 schedules print jobs queued in the jobs queue 80 to the plurality of concurrent job streams 85, 86, 87, one or more high resolution decomposition or raster image processing (RIP) engines 96 convert the first print jobs scheduled for printing into printable images that are stored in an images buffer 98. The sheet itineraries processor 92 includes a sheet assembler 100 that assembles the printable images into a sheet assembly trees or other data constructs representative of the printing operations to be performed on each sheet. A sheet scheduler 102 determines a sheet path for each sheet including information on which of the plurality of interconnected processing units 8, 10, 12, 14, 16, 18, 20 will perform which sheet processing tasks. For example, one possible sheet path in the system of FIG. 1 may use the upper path of the print media conveyor 20 and the marking engines 10, 12, while another possible sheet path may use the lower path of the print media conveyor 20 and marking engine 14. In the case of tandem or cluster printing (not illustrated), the possible sheet paths correspond to the linked printing systems. In the case of a printing system with a single marking engine and multiple destinations, output of the marking engine can be deposited in a selected one of the multiple destinations. In some embodiments, the functions of the sheet assembler 100 and the functions of the sheet scheduler 102 may be integrated together as a single unitary sheet itineraries processor.

The illustrated sheet itineraries processor 92 employs a late binding, in which processing units are not committed to performing processing on a given sheet until all processing units involved in processing that sheet have accepted their processing tasks. A suitable late binding approach is the propose-accept-confirm (PAC) sequence, in which the sheet scheduler 102 proposes via a coordinator 104 a sheet itinerary that assigns selected processing operations to selected ones of the processing units 8, 10, 12, 14, 16, 18, 20. Each targeted processing unit either accepts or rejects its proposed processing operation or operations. If any processing unit rejects its proposed processing operation, then the sheet scheduler 102 generates and proposes a new sheet itinerary. Once all of the processing units involved in a sheet itinerary accept their processing operations, the sheet itinerary is confirmed, thus binding the printing system 6 to execute the confirmed sheet itinerary. To perform PAC late-binding scheduling, each of the processing units 8, 10, 12, 14, 18, 20 includes its own corresponding unit controller 108, 110, 112, 114, 118, 120 respectively. The unit controllers perform the accept-or-reject phase of the PAC scheduling, and maintain a processing operation queue for corresponding processing units.

Both the job scheduler 82 and the sheet scheduler 102 make use of the system model 90. The system model 90 includes information on the capabilities of the processing units 8, 10, 12, 14, 16, 18, 20 of the printing system 6. For example, the system model 90 typically includes information on each of the installed marking engines 10, 12, 14, such as the type of marking engine (color marking engine, black marking engine), the maximum sheet throughput rate of the marking engine, the types of print media compatible with the marking engine, the current state of the marking engine, and its range of available states, where these can be changed. For example, marking engines 10, 12 may be in a state for printing normal weight print media but can be changed to a state in which they can accept heavy weight paper with an appropriate time delay. The system model 90 may also include information on the types of print media available in print media source 8, and the characteristics of the finisher 18, such as capabilities for stapling, collating, hole-punching, binding, and the like, and other functional characteristics.

The system model 90 may also include stored operational latitude models for stress relief, sustained performance, productivity, processing unit health, and so forth. For example, a stored operation latitude model may specify a maximum number of consecutive sheets of a given type of heavy-weight paper that a marking engine can print before it undergoes a recovery period (typically expressed in terms of one or more skipped pitches) or is used to print on a lighter-weight print media to counteract stress produced by printing on the heavy-weight paper. The latitude model may also include the number of sheets of normal paper that the marking engine is to print before the marking engine is permitted to return to printing a heavy weight paper. Processing unit health can be measured, for example, in terms of the number of printed sheets of a particular media type performed since a last maintenance procedure was performed.

Optionally, a system monitor 122 monitors the printing system 6. The coordinator 104 updates the system model 90 responsive to the system monitor 122 indicating a change in the one or more monitored characteristics of the plurality of interconnected processing units 8, 10, 12, 14, 16, 18, 20. Some or all of the system monitor functions may also be performed by the unit controllers 108, 110, 112, 114, 118, 120. For example, when the marking engine 10 experiences a change, the corresponding unit controller 110 can notify the coordinator 104 which updates the system model 90 accordingly.

The utility function 84 is based on the system model 90, and is optimized using a constrained optimization limited by user-selected constraints 130 and by inherent constraints of the print jobs. For example, user constraints may include a minimum productivity, a minimum image quality consistency, a maximum dwell time, or so forth. One example of an inherent print job constraint is a sheet ordering constraint that is typically implicit in a print job—the sheets of a document generally should be deposited in the print media destination in increasing or decreasing page number order, which inherently constrains the order in which those sheets can be processed by the printing system 6. The utility function 84 is based on user-selected weighting values for user preferences 132.

As a qualitative example, a minimum image quality consistency constraint can be set by a consistency mode setting that constrains the use of multiple marking engines within a single print job. If the minimum image quality consistency constraint is above a certain level for a particular print job, then it may be necessary for a single marking engine to be used to print all sheets of that print job so as to meet this high consistency constraint. On the other hand, if the minimum image quality consistency constraint is low for a particular print job, marking tasks for sheets of that print job are optionally divided up amongst two or more marking engines, since image quality inconsistencies between the two marking engines are tolerable. The job scheduler 82 can improve productivity by scheduling print jobs with low image quality consistency constraint values to concurrently executing job streams, since the sheets of those print jobs can be interleaved amongst different marking engines and different sheet processing paths to maximize sheet throughput. Similarly, scheduling two print jobs having high image quality consistency constraint values to concurrently executing job streams may also be advantageous, since each print job will be assigned different marking engines and sheet processing paths.

On the other hand, scheduling a print job having a high consistency constraint value and a print job with a low consistency constraint value to concurrently executing job streams may lower sheet throughput, since the optional sheet interleaving that would otherwise be available for the print job having the low consistency constraint value is substantially prohibited by the high consistency constraint value of one of the concurrently executing print job.

The user-selected weighting values for user preferences 132 provide softer constraints on the scheduling of print jobs by the print scheduler 82. A high weighting value for a user preference biases the job scheduling toward substantially satisfying that user preference, whereas a low weighting value for a user preference allows the job scheduling to substantially deviate from satisfying that user preference. Unlike the user selected constraints 130, the user-selected preference weightings 132 do not impose absolute constraints on the job scheduling; rather, the job scheduling can be balanced to substantially satisfy several heavily weighted user preferences, while deviating more strongly from lower weighted user preferences. The job scheduler 82 allocates the print jobs in the jobs queue 80 to the plurality of concurrent job streams 85, 86, 87 biased toward attaining the user preferences subject to the relative importance of each user preference as indicated by its weighting value.

In some embodiments, the utility function 84 is a mathematical function or computational construct that embodies the user selected parameters. A suitable format for the utility function is:

Utility=Value−Cost where value is a value of processed sheets of the print jobs expressed in a common metric, and cost is a cost of the processed sheets expressed in the common metric. In some embodiments, the common metric is a monetary value. The value and cost are weighted by the user preference weighting values.

For example, the value of a sheet may be a function of the paperweight and the type of marking (such as color, high quality black printed by a dedicated black marking engine, lower quality black printed by a color marking engine, or so forth), with the value placed on these attributes set by user weighting values. The cost may include various terms such as the cost of toner usage, wear cost (such as wear on the fuser amortized over the number of sheets printed between scheduled fuser maintenance), idle cost for idling a marking engine, off-line cost when a marking engine is off-line, mode change cost when, for example, a marking engine or the printing system 6 changes to a non-standard operational mode to accommodate printing of certain sheets, and so forth. The cost for printing a sheet or a page or image of a sheet typically depends upon which marking engine is used, and upon the user preference weighting values.

In some embodiments, a reweighting processor 136 adjusts the relative weightings of the user preferences to produce reweighted weighting values 138 expressed in monetary value or another selected common metric. The reweighting processor 136 may also reweight the user weightings to promote self-consistency. For example, setting the weights for both the productivity user preference and the image quality consistency user preference to very high values may be inconsistent, since high productivity may call for a high degree of sheet interleaving for each print job, whereas high image quality consistency may call for little or no sheet interleaving. In some embodiments, the reweighting is instead performed by normalizing factors or other corrections embodied in the utility function 84. For example, the utility function 84 can include unit conversion factors to express value and cost terms in the common metric.

Another example of a user-weighted preference incorporated into the utility function 84 is a dwell time penalty cost term. A given print job has a minimum dwell time, defined as the fastest throughput for that print job assuming that all resources of the printing system 6 are dedicated to that print job. For example, in a print job that consists predominantly of black sheets but which also includes some color sheets, the minimum dwell time ($T_{dwell,min}$) is achieved by printing some of the black sheets using color marking engines. A user preference strongly weighted toward high print consistency biases against using color marking engines for some of the black sheets. But, if all black sheets are printed using only black marking engines, the actual dwell time ($T_{dwell}$) for the scheduled processing of the print job may be much longer than the minimum dwell time $T_{dwell,min}$. To bias against an overly long dwell time, a dwell time penalty cost term can be included in the utility function 84, such as for example Cost (dwell)=($T_{dwell}$−$T_{dwell,min}$)×Penalty assessed for all dwell times $T_{dwell}$>2×$T_{dwell,min}$, where Penalty is the user-selected weight for the dwell time penalty cost. If Penalty=0, then there is no penalty assessed. On the other hand, a large value for Penalty will add a large cost for dwell times $T_{dwell}$ that substantially exceed twice the minimum dwell time $T_{dwell,min}$. Optionally, another user selectable parameter sets the onset dwell time for assessing the penalty. For example, the dwell time penalty can be assessed for all dwell times $T_{dwell}$>Onset×$T_{dwell,min}$, where Onset is a user selected onset value for assessing the dwell time penalty cost component.

A suitable function optimizer 140 optimizes the utility function 84 respective to the scheduling of print jobs to the job streams 85, 86, 87. In some embodiments, the function optimizer 140 computes a value for the utility function 84 for each possible schedule of print jobs to the plurality of job streams 85, 86, 87, and selects the schedule of print jobs that produces an optimal value of the utility function 84. This exhaustive approach is feasible in typical printing systems, because the number of print jobs in the jobs queue 80 is typically relatively small, such as less than twenty or so print jobs. The number of job streams 85, 86, 87 is also typically relatively small, corresponding to the number of print media destinations 30, 32, 34. For example, if there are two job streams $JS_1$, $JS_2$, and four print jobs P1, P2, P3, P4, then the number of possible print job schedules is forty-two. Twelve possible job schedules (4!/2! where "!" denotes factorial) are possible in which the jobs are allocated as two jobs in each of the two job streams JS1, JS2, as follows:

| | | |
|---|---|---|
| Schedule #1: | $JS_1$: P1, P2 | $JS_2$: P3, P4 |
| Schedule #2: | $JS_1$: P1, P2 | $JS_2$: P4, P3 |
| Schedule #3: | $JS_1$: P1, P3 | $JS_2$: P2, P4 |
| Schedule #4: | $JS_1$: P1, P3 | $JS_2$: P4, P2 |
| Schedule #5: | $JS_1$: P1, P4 | $JS_2$: P2, P3 |
| Schedule #6: | $JS_1$: P1, P4 | $JS_2$: P3, P2 |
| Schedule #7: | $JS_1$: P2, P1 | $JS_2$: P3, P4 |
| Schedule #8: | $JS_1$: P2, P1 | $JS_2$: P4, P3 |
| Schedule #9: | $JS_1$: P2, P3 | $JS_2$: P4, P1 |
| Schedule #10: | $JS_1$: P2, P4 | $JS_2$: P3, P1 |
| Schedule #11: | $JS_1$: P3, P1 | $JS_2$: P4, P2 |
| Schedule #12: | $JS_1$: P3, P2 | $JS_2$: P4, P1 |

In Schedule #1, for example, print jobs P1 and P3 are executed concurrently via job streams $JS_1$ and $JS_2$, respectively. Print job P2 is printed via job stream $JS_1$ after print job P1 completes, while print job P4 is printed via job stream $JS_2$ after print job P3 completes. Print jobs P2 and P4 are printed substantially concurrently if the print jobs P1 and P3 finish at about the same time. On the other hand, if for example print job P1 finishes much earlier than print job P3, then for Schedule #1 at least a beginning portion of print job P2 will be executed concurrently with an ending portion of print job P3. Also, it is noted that an schedule such as:

$JS_1$: P3, P4 $JS_2$: P1, P2 is equivalent to Schedule #1 given above, merely swapping the job stream designations, and hence is not a distinguishable print job schedule from the Schedule #1 given above. It is noted that the job scheduling can include idle time for one or more of the job streams. For example, if print jobs P1, P2, and P3 are low average coverage print jobs while the fourth print job P4 is a high average coverage print job, it may be advantageous to schedule P1, P2, and P3 in one job stream and P4 in the other job stream. In this case, P1, P2, and P3 are processed concurrently with P4. This scheduling balances coverage during the concurrent processing, but it may result in the job stream processing P4 having substantial idle time if print job P4 completes before the three concurrent print jobs P1, P2, P3 complete. Considering such non-balanced allocations of print jobs between the two job streams $JS_1$, $JS_2$, an additional six possible schedules (3!/1!) result if three of the print jobs are allocated to a single job queue with the fourth print job allocated to the other job queue. An additional twenty-four possible schedules (4!/0!) result if all four print jobs are allocated to a single job queue, completing the forty-two possible combinations. As the number of print jobs or job streams increases, the number of possible print job schedules increases accordingly; however, for typical numbers of print jobs and typical numbers of job streams, the number of possible print job schedules is generally a few hundred or lower, which is feasibly processed by an exhaustive search for the optimized utility function 84.

The exhaustive combinatorial optimization set forth above is suitable for typical printing systems having a few print jobs to a few tens of print jobs, and a few job streams to a few tens of job streams. The exhaustive combinational optimization spans a space defined by the set of all possible schedules for processing queued print jobs. Optionally, however, a non-exhaustive approach can be used for optimizing the utility function 84, such as a limited horizon optimization approach. A limited horizon optimization spans a space defined by a sub-set of the possible schedules. It is to be appreciated that the optimized or optimal value of the utility function 84 may not be a global optimum for all possible schedules of print jobs, but rather may be a value of the utility function that is "good enough". For example, an exhaustive combinatorial optimization search of the possible print job schedules may be terminated when a print job schedule is identified that has a small enough or large enough value of the utility function 84.

Moreover, it is to be appreciated that the information about the print jobs that the scheduling is based upon may be of coarse resolution, may represent estimates, or be otherwise inexact. For example, the coarse RIP engine 88 may provide an estimate of the number of black pages and the number of color sheets, which may be less than exact due to the use of the coarse RIP processing. In some embodiments, the low resolution decomposition performed by the engine 88 also does not provide detailed sheet-level information, such as information on the distribution of color and black pages within sheets of the print job. Based on the information about the print jobs provided by the low resolution decomposition, which may be incomplete, the jobs scheduler 82 to determine a jobs schedule that at least approximates a global optimum.

Whenever a new print job is added to the jobs queue 80, the jobs scheduler 82 optionally re-optimizes the utility function 84 for those print jobs not too far along in processing, so as to ensure that the jobs schedule is optimized for the print jobs including the newly added print job. In some embodiments, the optimization is repeated for all print jobs which have not begun printing; that is, the optimization is repeated for all print jobs which do not have at least one sheet being processed by the printing system 6. In other embodiments, the optimization may be repeated only for those print jobs that have not been substantially processed by the high resolution decomposition RIP engines 96. These latter embodiments are suitable, for example, where the RIP engines 96 are substantially faster than the printing system 6, so that the images buffer 98 contains a large amount of images that would need to be discarded or stored for an extended period if the corresponding print jobs are delayed by a re-optimized scheduling.

The scheduling of print jobs is also optionally re-optimized when the system model 90 is updated responsive to the system monitor 122 or one of the unit controllers 108, 110, 112, 114, 118, 120 indicating a change in the one or more monitored characteristics of the plurality of interconnected processing units 8, 10, 12, 14, 16, 18, 20. Thus, for example, when the system monitor 122 or the unit controller 110 detects a failure or other change in the marking engine 10, the coordinator 104 updates the system model 90. The jobs scheduler 82 then re-optimizes the scheduling of print jobs to take into account the changed capabilities of the printing system 6.

In some embodiments, the optimization is performed using a limited horizon constraint-based optimization spanning a space defined by a sub-set of possible schedules for processing queued print jobs. For example, if the limited horizon is defined as optimizing over only the four most recently received print jobs, and the number of job streams is two, then the forty-two possible schedules for the four most recently received print jobs can be stored and processed as a fixed table of possible schedules of the four print jobs within the horizon.

In some embodiments, a packet of print jobs are selected to be scheduled for substantially concurrent processing. The selection identifies complementary print jobs that optimize the utility function when processed concurrently. For the example printing system 6 having three job streams 85, 86, 87, job packets each consisting of three complementary print jobs can be assembled into a job packet that is processed concurrently by the printing system 6. The complementary print jobs of a job packet are selected to optimize the utility function for that job packet. For example, if the utility function emphasizes reliability, a suitable job packet may include one or two monochrome print jobs with high coverage area and one or two monochrome print jobs with lower coverage area. Such a job packet reduces stress on the printing system 6, since the combined job packet has about average coverage. In constructing the job packet, a sub-set of the queued print jobs may be considered using a limited horizon constraint-based optimization, rather than including every print job in the queue 80 in selecting the print jobs for the packet. Alternatively, an exhaustive search of all combinations of all print jobs can be performed to identify an optimal packet.

The function optimizer 140 optimizes the utility function 84. However, the term "optimized" or "optimal" does not necessarily denote a global optimum schedule of print jobs, but may instead denote a schedule of print jobs which satisfies the utility function to a selected threshold level, or which satisfies the utility function for a selected sub-set of the queued print jobs, or which satisfies the utility function for a limited horizon optimization, or so forth.

With reference to FIGS. 1 and 2, the user selected parameters 130, 132 can be supplied in various ways. For example, the user interface can include annotations 144 to the electronically supplied print job 42. Such annotated user preferences and constraints are typically applicable only to that print job 42 having the annotations 72. In some embodiments, the annotations 144 are created by the user via a printer options dialog window 146 (displayed diagrammatically on the example networked computer 54) operable in conjunction with a network user account. The printer options dialog window 146 may be associated with a specific word processor, spreadsheet or other application program that generates the print job. In this approach, the user selects weightings and constraint values through the printer options dialog window 146; these user preference weightings and constraint values subsequently apply to all print jobs initiated by that user account or by the specific application software package executing under that user account.

Figure 3:
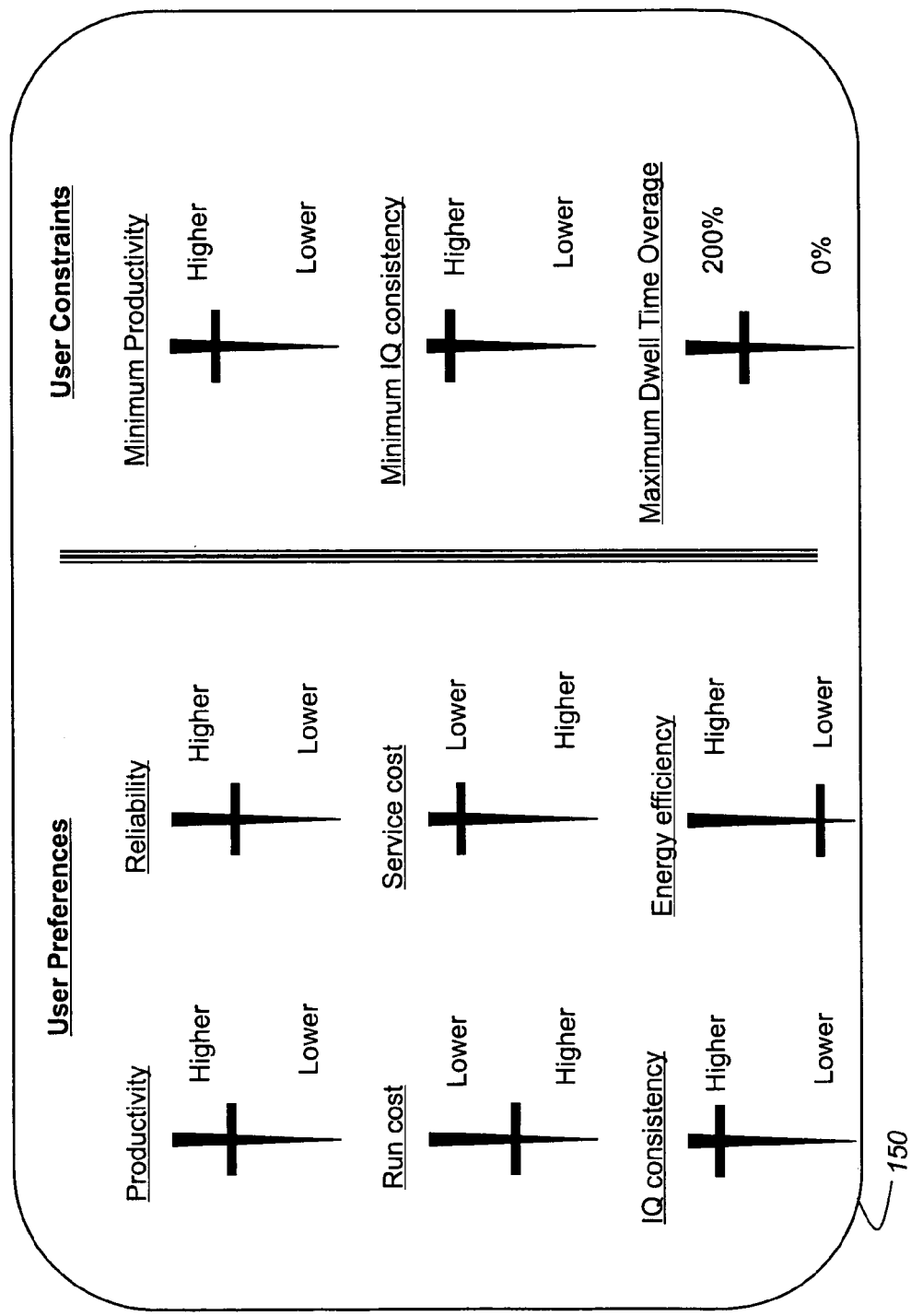
FIG. 3 diagrammatically shows one suitable embodiment of a user interface for inputting weighting values for user preferences and for inputting values of user selectable constraints.

With continuing reference to FIGS. 1 and 2, and with further reference to FIG. 3, in another approach the user selected parameters 130, 132 are input via an optional dedicated user interface 150 of the printing system 6. As shown in example FIG. 3, The user is presented with slider bars on a display of the user interface 150, and employs one or more user operable input devices to manipulate the slider bars to set the user selected parameters. The example display shown in FIG. 3 includes slider bars for inputting weights for user preferences including: productivity; reliability; run cost; service cost; image quality (IQ) consistency; and energy efficiency. The example display shown in FIG. 3 also includes slider bars for inputting values of user-selected constraints including: minimum productivity; minimum image quality (IQ) consistency; and maximum dwell time. The illustrated user preferences and constraints are examples; additional, fewer, or other user preferences or constraints can be included. Moreover, the optional dedicated user interface 150 can be used for other purposes, such as displaying the state of the printing system 6 as indicated by the system monitor 122.

The printing controller 44 illustrated diagrammatically in FIGS. 1 and 2 can be embodied in various ways. For example, in some embodiments the printing controller 44 is embodied as a digital processor and associated memory and other electronics integrally built into the printing system 6. In other embodiments, the printing controller 44 is a embodied as a computer connected with the printing system 6 either directly or via the network 50. The functionality of the printing controller 44 can also be physically separated. For example, the jobs scheduler 82 may be embodied by a computer, while the sheet itineraries processor 92 may be electronics integrated into the printing system 6. The unit controllers 108, 110, 112, 114, 118, 120 can be variously embodied as electronics built into the corresponding processing units 8, 10, 12, 14, 18, 20 (as illustrated diagrammatically in FIG. 1), as software running on one or more computers (which one or more computers may also optionally embody some or all of the printing controller 44), or so forth. The disclosed jobs scheduling techniques are applicable to substantially any type of printing system or arrangement that provides concurrent sheet processing paths, including tandem printing systems, cluster printing systems, parallel printing systems, modular printing systems, and so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing controller comprising:
   a jobs scheduler determining a schedule for processing queued print jobs using a plurality of concurrent job streams of a printing system is selected from a group consisting of: (i) a tandem printing system having two independent sheet processing paths, (ii) a cluster printing system having three or more independent sheet processing paths, (iii) a modular printing system having two or more marking engines interconnected by a print media conveyor, and (iv) a printing system having only one marking engine that processes the plurality of concurrent job streams by interleaving sheets of different print jobs, the printing system including one or more marking engines and multiple print media destinations, the job scheduler determining the schedule using a method including:
     determining a utility function dependent at least upon user preference weighting values, a system model of capabilities of the parallel printing system, and the schedule of the queued print jobs, and
     optimizing the utility function respective to the schedule of queued print jobs.

2. The controller as set forth in claim 1, wherein the determined schedule associates all sheets of each print job with a single print media destination.

3. The controller as set forth in claim 1, wherein the optimizing of the utility function comprises:
   employing a combinatorial optimization of the utility function respective to the schedule of queued print jobs, the combinational optimization spanning a space defined by a set of possible schedules for processing queued print jobs.

4. The controller as set forth in claim 1, wherein the optimizing of the utility function comprises:
   selecting a packet of print jobs to be scheduled for substantially concurrent processing, the selecting identifying complementary print jobs that optimize the utility function when processed concurrently.

5. The controller as set forth in claim 1, wherein the optimizing of the utility function comprises:
performing a constrained optimization constrained by one or more user-selected constraints.

6. The controller as set forth in claim 5, wherein the constrained optimization includes a limited horizon constraint-based optimization spanning a space defined by a sub-set of possible schedules for processing queued print jobs.

7. The controller as set forth in claim 5, wherein the printing system includes two or more marking engines, and the one or more user-selected constraints include a consistency mode setting constraining use of multiple marking engines within a single print job.

8. A printing controller comprising:
a jobs scheduler determining a schedule for processing queued print jobs using a plurality of concurrent job streams of a printing system including one or more marking engines and multiple print media destinations, the job scheduler determining the schedule using a method including:
determining a utility function dependent at least upon user preference weighting values, a system model of capabilities of the parallel printing system, and the schedule of the queued print jobs, and
optimizing the utility function respective to the schedule of queued print jobs,
wherein the utility function comprises a difference between (i) a value of processed sheets of the print jobs expressed in a common metric and (ii) a cost of the processed sheets expressed in the common metric, at least one of the value and the cost depending upon the user preference weighting values and wherein at least one of the following holds:
the value of the processed sheets comprises a value assigned to sheets from each marking engine determined by at least one of the user preference weighting values, and
the cost of the processed sheets comprises cost of producing the processed sheets based on the marking engine used and at least one of the user preference weighting values.

9. The controller as set forth in claim 8, wherein the value of the processed sheets comprises a value assigned to sheets from each marking engine determined by at least one of the user preference weighting values.

10. The controller as set forth in claim 8, wherein the cost of the processed sheets comprises cost of producing the processed sheets based on the marking engine used and at least one of the user preference weighting values.

11. The controller as set forth in claim 10, wherein the cost of the processed sheets further comprises cost of idling one or more marking engines determined by one of the user preference weighting values.

12. The controller as set forth in claim 10, wherein the cost of the processed sheets further comprises cost of configuring a marking engine to produce the processed sheets determined by one of the user preference weighting values.

13. The controller as set forth in claim 10, wherein the cost of the processed sheets further comprises cost of exceeding a minimum print job dwell time determined by one of the user preference weighting values.

14. The controller as set forth in claim 8, wherein the common metric is a monetary unit.

15. A xerographic printing system comprising:
a plurality of interconnected processing units including one or more xerographic marking engines, the interconnected processing units defining a plurality of sheet processing paths terminating at print media destinations;
a jobs scheduler scheduling print jobs to a plurality of concurrent job streams using a utility function based on user selected parameters and a system model indicative of the plurality of interconnected processing units, each job stream employing one or more of the plurality of sheet processing paths, the jobs scheduler including a function optimizer that optimizes the utility function with respect to the scheduling of print jobs to the plurality of job streams; and
a sheet itineraries processor that causes the plurality of interconnected processing units to concurrently move sheets of the concurrent job streams along selected sheet processing paths to process the sheets and to deliver each processed sheet to a print media destination corresponding to the print job of which that sheet is a part.

16. The printing system as set forth in claim 15, wherein the function optimizer (i) computes values of the utility function for each possible schedule of print jobs to the plurality of job streams and (ii) selects the schedule of print jobs that produces an optimal value of the utility function.

17. The printing system as set forth in claim 15, wherein the function optimizer (i) computes values of the utility function for each possible schedule of a sub-set of print jobs within a selected horizon to the plurality of job streams and (ii) selects the schedule of print jobs that produces an optimal value of the utility function.

18. The printing system as set forth in claim 15, wherein the function optimizer (i) computes values of the utility function for packets of complementary jobs suitable for concurrent execution and (ii) selects the packet of print jobs that produces an optimal value of the utility function.

19. The printing system as set forth in claim 15, wherein the user selected parameters include user-selected constraints, the jobs scheduler performing the optimization as a constrained optimization constrained by at least the user-selected constraints.

20. A xerographic printing system comprising:
a plurality of interconnected processing units including one or more xerographic marking engines, the interconnected processing units defining a plurality of sheet processing paths terminating at print media destinations, wherein the plurality of interconnected processing units define one of:
a tandem or cluster printing system in which each of the sheet processing paths terminates in different print media destination, and
a print media conveyor selectably linking at least two xerographic marking engines to define a selected sheet processing path for each sheet;
a jobs scheduler scheduling print jobs to a plurality of concurrent job streams using a utility function based on user selected parameters and a system model indicative of the plurality of interconnected processing units, each job stream employing one or more of the plurality of sheet processing paths; and
a sheet itineraries processor that causes the plurality of interconnected processing units to concurrently move sheets of the concurrent job streams along selected sheet processing paths to process the sheets and to deliver each processed sheet to a print media destination corresponding to the print job of which that sheet is a part.

21. The printing system as set forth in claim 20, wherein the plurality of interconnected processing units include unit controllers, the printing system further comprising:

a coordinator linking the sheet itineraries processor with the unit controllers, the coordinator negotiating sheet processing operation requests of the sheet itineraries processor with the unit controllers which control corresponding processing units to perform the negotiated sheet processing operations.

22. The printing system as set forth in claim 21, wherein the coordinator comprises:

a system monitor that monitors one or more monitored characteristics of the plurality of interconnected processing units, the coordinator updating the system model responsive to the system monitor indicating a change in the one or more monitored characteristics of the plurality of interconnected processing units.

23. The printing system as set forth in claim 20, further comprising:

a user interface by which an associated user provides the user selected parameters, the user interface including at least one of:
  (i) a display and at least one user-operable input device, the display providing input options corresponding to user preferences that can be manipulated by the user via the at least one user-operable input device to set weighting values of the user preferences,
  (ii) weighting values for user preferences that are annotated to a print job, and
  (iii) a printer options dialog window by which an associated user selects weighting values for user preferences,
the user selected parameters including at least the weighting values, the jobs scheduler allocating the print jobs to the plurality of job streams using the utility function which is based on the weighting values of the user preferences.

24. The printing system as set forth in claim 20, wherein the processing units of the plurality of processing units are selected from a group consisting of: marking engines, finishers, collators, and paper handlers.

25. A printing method comprising:

maintaining a system model of a printing system including a plurality of interconnected processing units, the system model indicating characteristics of each processing unit;

scheduling received print jobs for processing via one or more job streams by optimizing a utility function that is dependent upon user selected parameters, the jobs schedule, and the system model, the optimization of the utility function being constrained by one or more optimization constraints including at least one of:
  a horizon limit constraint in which the constrained optimization spans a space defined by a sub-set of possible schedules for processing received print jobs, and
  a consistency mode setting constraining use of multiple marking engines within a single print job; and processing the print jobs via the one or more job streams using the plurality of interconnected processing units in accordance with the optimized jobs schedule.

26. The printing method as set forth in claim 25, wherein the user selected parameters include weighting values for user preferences, the optimizing of the utility function optimizing a value versus cost relationship that is weighted by the weighting values.

27. The printing method as set forth in claim 25, further comprising:

monitoring one or more monitored characteristics of the plurality of processing units;

updating the system model responsive to the monitoring indicating a change in the one or more monitored characteristics of the plurality of processing units; and re-scheduling the received print jobs based on the updated system model.

28. The printing method as set forth in claim 25, further comprising:

receiving a new print job; and re-scheduling the received print jobs including the new print job for processing via the one or more job streams by re-optimizing the utility function.

29. The printing method as set forth in claim 28, wherein the re-scheduling does not re-schedule print jobs whose processing using the plurality of interconnected processing units in accordance with the previously optimized jobs schedule is beyond a selected processing point.

30. The printing method as set forth in claim 25, wherein the constrained optimization includes a limited horizon constraint-based optimization spanning a space defined by a sub-set of possible schedules for processing received print jobs.

31. The printing method as set forth in claim 25, wherein the printing system includes two or more marking engines, and the one or more optimization constraints include a consistency mode setting constraining use of multiple marking engines within a single print job.

* * * * *